United States Statutory Invention Registration [19]

[11] Reg. Number: H285

Downs et al. [43] Published: Jun. 2, 1987

[54] OXYGEN RICH IGNITER COMPOSITIONS

[75] Inventors: David S. Downs, Flanders; Carl H. Roller, Succasunna; Bernard Strauss, Rockaway, all of N.J.

[73] Assignee: The United States of America as represented by the Secretary of the Army, Washington, D.C.

[21] Appl. No.: 855,204

[22] Filed: Mar. 5, 1986

Related U.S. Application Data

[63] Continuation of Ser. No. 780,120, Sep. 25, 1985.

[51] Int. Cl.[4] ..... C06B 29/20

[52] U.S. Cl. ..... 149/79; 149/82; 149/83; 149/85; 149/98

[58] Field of Search ..... 149/79, 98, 82, 83, 149/85

[56] References Cited

U.S. PATENT DOCUMENTS

| | | | |
|---|---|---|---|
| 995,187 | 6/1911 | Sayers et al. | 149/79 |
| 3,328,217 | 6/1967 | Ferguson | 149/79 |
| 3,856,590 | 12/1974 | Kincaid et al. | 149/79 |

*Primary Examiner*—Stephen J. Lechert, Jr.

*Attorney, Agent, or Firm*—Anthony T. Lane; Harold H. Card, Jr.; Edward F. Costigan

[57] ABSTRACT

Low (thermal) Vulnerability Ammunition or LOVA is more responsive to the thermal stimulation of the igniter compositions disclosed herein. The igniter compositions of this invention generate oxygen rich flames upon decomposition. Such igniter compositions comprise nitrocellulose, nitroglycerine, potassium perchlorate and ethyl centralite. An agent comprising one or more titanate salts and/or carbon black may optionally be included in such compositions to the extent of about 0.35% w/w. Such compositions can be extruded and utilized in strand form.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OXYGEN RICH IGNITER COMPOSITIONS

The invention described herein may be manufactured, and licensed by or for the Government for Governmental purposes without the payment to us of any royalties thereon.

This application is a continuation of application Ser. No. 780,120, filed Sept. 25, 1985.

This invention relates to certain oxygen rich igniter compositions, to primers made therefrom and to artillery shells and cartridges comprising such primers.

Low Vulnerability Ammunition (LOVA) which is less vulnerable to ignition by thermal stimulus, especially that introduced by hot metallic particles has led to the development of low vulnerability propellants. These so-called LOVA propellants are consequently more difficult to ignite with standard igniters used in such ammunition. In tank ammunition, this property of more difficult ignition exhibits itself in longer ignition delays, especially at low temperatures together with reduced performance of such ammunition. Thus, any enhanced internal use safety of such ammunition is counterbalanced by greater vulnerability under enemy fire as a result of a lack of adequate responsiveness.

Ignition of a LOVA propellant charge is complicated by several factors. By design, the material is less vulnerable to thermal ignition than conventional propellants. If is therefore, more difficult to ignite. Because of lower burning rates, the web and grain size of the propellant are relatively small. This leads to reduced permeability and resistance to flow of the igniter gases and flame-spreading of propellant combustion products within the bed.

In ignitability studies of some LOVA propellant formulations which have been reported, it appears that the chemical composition of the igniter flame may play an important role in causing the desired ignition. See Varney, M. A., Martino, J., and Henry, R., "Ignitability Studies of LOVA Propellants", Proceedings of the 20th JANNAF Combustion Meeting, Oct. 1983, CPIA Publ. 383, Vol. I, p. 547. In particular, igniter flames containing excess oxygen may tend to be more efficient. It has now been found that the igniter compositions of this invention do in fact produce the desired level of performance.

It is not clear at this time whether the improved performance is due to reactions with the decompostion products of the inert binder used in the LOVA propellant or the nitramine contained in the propellant or both. It may well be that the inert binder decomposes initially to provide a fuel-rich gaseous product which reacts well with the oxidizer rich igniter flame. Whatever may be the mechanism by which the igniter compositions of this invention bring about improved LOVA ammunition performance, the fact remains that such improved performance is unexpectedly superior to that obtained by the use of a conventional igniter composition such as Benite.

Benite is included as the major igniter material in a bayonet-type electric primer which is a standard component of LOVA ammunition. A typical LOVA cartridge contains a granular propellant which is ignited with such bayonet-type electric primer. The primer head assembly contains a bridge wire ignited match which ignites a booster charge of black powder. The booster charge ignites the main charge which is Benite. Benite is a physical mixture of nitrocellulose and the constituents of black powder (also known as gunpowder), namely, potassium nitrate, carbon and sulfur. In a typical twenty-four (24) vent hole steel primer, Benite is utilized in the form of twenty-four (24) separate strands, each being 0.22 cm in diameter and each being 25.4 cm or 10 inches long.

Comparable strands are made from the igniter compositions of this invention which comprises nitrocellulose in admixture with other ingredients. However, the performance of the strands made from the igniter compositions of this invention have unexpectedly superior performance over comparable Benite strands.

According to this invention, an improved composition for igniting low thermal stimulus vulnerability propellants is provided which comprises a mixture of nitrocellulose, nitroglycerine, potassium perchlorate and ethyl centralite and an optional amount of from about 0.01% w/w up to about 0.35% w/w of an agent selected from the-group consisting of titanate salts, carbon black and mixtures thereof.

The optional agent may, as already noted above consist of either carbon black alone or carbon black in admixture with one or more titanate salts. Alternatively, the agent may omit carbon black altogether and consist purely of one or more titanate salts.

In another aspect of this invention, the improved composition underlying the invention is provided in the form an extruded strand.

In yet another aspect of the invention, a cartridge for the propulsion of one or more projectiles therefrom is provided which comprises a bed of low thermal stimulus vulnerability propellant in adjacent location to a primer comprising the composition underlying this invention. In a further aspect of the invention a cartridge is provided for the propulsion of one or more projectiles therefrom which comprises a bed of low thermal stimulus vulnerability propellant in adjacent location to a primer comprising the extruded strand also underlying this invention.

The following illustrative but non-limiting examples will aid in a further understanding of the present invention.

Example A

The four ingredients noted below are mixed together in the proportions shown:

| Ingredient | % w/w |
|---|---|
| Nitrocellulose | 30.8 |
| Nitroglycerine | 20.7 |
| Potassium perchlorate | 47.5 |
| Ethyl centralite | 1.0 |

The resulting mixture is divided into three (3) batches. The first batch is extruded through a 0.075 inch (0.1905 cm) die and cut into 10 inches (25.4 cm) lengths. The second batch is extruded through a 0.22 cm (0.0866 inch) die and cut into 10 inches (25.4 cm) lengths. The third batch is extruded through a 0.110 inch (0.2794 cm) die and cut into 10 inches (25.4 cm) lengths.

This demonstrates the ready extrudability of the resulting mixture into almost any desired shape.

The ignition effectiveness of the resulting strands is evaluated in accordance with the procedure described in Varney, M. A., Martino, J., and Henry, R., "Expanded Ignition Effectiveness Tests of Selected Igniter Materials with Navy Propellants", Proceedings of the 21st JANNAF Combustion Meeting, Oct. 1984.

The ignition performance of the strands made out of the mixture composition described in this example is found to be superior to that of Benite strands of the same size. The performance of the strands made according to this example is found to be superior to that of comparable Benite strands in that their utilization in tank ammunition results in shorter ignition delays, improved low temperature performance and improved ballistic efficiency. Likewise, ignitability tests of the strands made according to this example with a LOVA propellant also show superior results as against comparable Benite strands.

Chemical analysis of the decomposition product of the mixture composition described in this example shows the presence of 12% (mass fraction) oxygen at the flame temperature.

Example B

The four ingredients noted below are mixed together in the proportions shown:

| Ingredient | % w/w |
|---|---|
| Nitrocellulose | 25.8 |
| Nitroglycerine | 15.6 |
| Potassium perchlorate | 57.6 |
| Ethyl centralite | 1.0 |

The resulting mixture is processed and tested in the same manner as described in Example A above.

Once again, the ignition performance of the strands made out of the mixture composition described in this example is found to be superior (in the same respects) to that of Benite strands of the same size.

Chemical analysis of the decomposition product of the mixture composition described in this example shows the presence of 19% (mass fraction) oxygen at the flame temperature.

Example C

A mixture is prepared which is substantially identical to that described in Example A except that 0.12% w/w less is employed of all ingredients except ethyl centralite and the balance is made up with 0.36% w/w of carbon black.

The resulting mixture has improved propellant processing and combustion characteristics as against the mixture of Example A.

Example D

A mixture is prepared which is substantially identical to that described in Example A except that 0.12% w/w less is employed of all ingredients except ethyl centralite and the balance is made up with 0.36% w/w of a titanate salt.

The resulting mixture has improved propellant processing and combustion characteristics as against the mixture of Example A.

Example E

A mixture is prepared which is substantially identical to that described in Example A except that 0.12% w/w less is employed of all ingredients except ethyl centralite and the balance is made up with 0.36% w/w of a mixture of titanate salts.

The resulting mixture has improved propellant processing and combustion characteristics as against the mixture of Example A.

Example F

A mixture is prepared which is substantially identical to that described in Example A except that 0.12% w/w less is employed of all ingredients except ethyl centralite and the balance is made up with 0.36% w/w of a mixture which comprises equal quantities of carbon black and of a titanate salt.

The resulting mixture has improved propellant processing and combustion characteristics as against the mixture of Example A.

Example G

A mixture is prepared which is substantially identical to that described in Example A except that 0.12% w/w less is employed of all ingredients except ethyl centralite and the balance is made up with 0.36% w/w of a mixture which comprises equal quantities of carbon black and of a mixture of titanate salts.

The resulting mixture has improved propellant and combustion characterrstics as against the mixture of Example A.

As the above Examples illustrate, variation of the potassium perchlorate component of the igniter composition of this invention from 47% w/w to 58% w/w results in the presence in the gaseous decomposition product of such igniter composition of free oxygen in range of 12% (mass fraction) to 19% (mass fraction) at the flame temperature.

All variations of the four components noted in Examples A and B within the ranges indicated therein may be gainfully utilized. Lower amounts of potassium perchlorate may also be gainfully utilized. For any given application, a person of ordinary skill in the art to which the present invention pertains (or artisan) will be able to formulate suitable proportions for each one of the respective ingredients without having to resort to undue experimentation. All that such artisan will need to bear in mind is that the decomposition product of the resulting composition should preferably contain from 10% (mass fraction) to 20% (mass fraction ) free oxygen at the flame temperature.

The scope of the present invention is further defined by and should be read in conjunction with the appended claims.

What is claimed is:

1. An improved oxygen-rich igniter composition for use with low thermal stimulus vulnerability propellants consisting essentially of:

a. nitrocellulose between about 25.8% and 30.8%, b. nitroglycerin between about 15.6% and 20.7%, c. potassium perchlorate between about 47.5% and 57.6%, and d. ethyl centralite at about 1.0%, all percentages being by weight based on the weight of the igniter composition.

2. The igniter composition of claim 1 including about 0.35% by weight of an agent selected from the group consisting of titanate salts, carbon black, and mixtures thereof.

3. An improved oxygen-rich igniter composition for use with low thermal stimulus vulnerability propellants consisting essentially of:

a. nitrocellulose at about 30.8%, b. nitroglycerin at about 20.7%, c. potassium perchlorate at about 47.5%, and d. ethyl contralite at about 1%, all percentages being by weight based on the weight of the igniter composition.

4. The igniter composition of claim 3 including about 0.35% by weight of an agent selected from the group consisting of titanate salts, carbon black, and mixtures thereof.

5. An improved oxygen-rich igniter composition for use with low thermal stimulus vulnerability propellants consisting essentially of:

a. nitrocellulose at about 25.8%, b. nitroglycerin at about 15.6%, c. potassium perchlorate at about 57.6%, and d. ethyl centralite at about 1.%, all percentages being by weight based on the weight of the igniter composition.

6. The igniter composition of claim 5 including about 0.35% by weight of an agent selected from the group consisting of titanate salts, carbon black, and mixtures thereof.

* * * * *